(12) United States Patent
Lin

(10) Patent No.: US 9,016,954 B2
(45) Date of Patent: Apr. 28, 2015

(54) OPTICAL FIBER CONNECTOR

(75) Inventor: Ching-Yuan Lin, Kaohsiung (TW)

(73) Assignees: Gloriole Electroptic Technology Corp., Kaohsiung (TW); Ample Sun Trading Limited, Tortola (VG)

( * ) Notice: Subject to any disclaimer, the term of this patent is extended or adjusted under 35 U.S.C. 154(b) by 100 days.

(21) Appl. No.: 13/478,326

(22) Filed: May 23, 2012

(65) Prior Publication Data

US 2013/0121647 A1 May 16, 2013

(30) Foreign Application Priority Data

Nov. 14, 2011 (TW) .............................. 100221450 U

(51) Int. Cl.
*G02B 6/36* (2006.01)
*G02B 6/38* (2006.01)

(52) U.S. Cl.
CPC ............ *G02B 6/3869* (2013.01); *G02B 6/3821* (2013.01); *G02B 6/3849* (2013.01); *G02B 6/3887* (2013.01); *G02B 6/3894* (2013.01)

(58) Field of Classification Search
CPC .. G02B 6/3821; G02B 6/3849; G02B 6/3869; G02B 6/3887; G02B 6/3894; G02B 6/3846; G02B 6/3807; G02B 6/387
USPC ...................................... 385/78, 55; 264/1.25
See application file for complete search history.

(56) References Cited

U.S. PATENT DOCUMENTS

| | | | | |
|---|---|---|---|---|
| 4,733,935 | A * | 3/1988 | Gandy | 385/69 |
| 5,287,425 | A * | 2/1994 | Chang | 385/81 |
| 6,179,481 | B1 * | 1/2001 | Sung | 385/78 |
| 2001/0002220 | A1 * | 5/2001 | Throckmorton et al. | 385/66 |
| 2003/0031447 | A1 * | 2/2003 | Nault | 385/131 |
| 2003/0077048 | A1 * | 4/2003 | Radek et al. | 385/81 |
| 2003/0161586 | A1 * | 8/2003 | Hirabayashi | 385/78 |
| 2004/0151437 | A1 * | 8/2004 | Marrs et al. | 385/78 |
| 2005/0053342 | A1 * | 3/2005 | Melton et al. | 385/113 |
| 2005/0232553 | A1 * | 10/2005 | Holmquist | 385/78 |
| 2007/0286554 | A1 * | 12/2007 | Kuffel et al. | 385/60 |
| 2008/0044137 | A1 * | 2/2008 | Luther et al. | 385/60 |
| 2008/0050070 | A1 * | 2/2008 | Gurreri et al. | 385/55 |
| 2008/0273855 | A1 * | 11/2008 | Bradley et al. | 385/139 |
| 2009/0310923 | A1 * | 12/2009 | Hovland et al. | 385/94 |
| 2010/0046892 | A1 * | 2/2010 | Milette et al. | 385/83 |
| 2010/0092137 | A1 * | 4/2010 | Niiyama et al. | 385/78 |

OTHER PUBLICATIONS

European Search Report issued for counterpart application No. EP 12 17 4411, dated Jan. 24, 2013.

* cited by examiner

*Primary Examiner* — Peter Radkowski
(74) *Attorney, Agent, or Firm* — Dickstein Shapiro LLP

(57) ABSTRACT

An optical fiber connector includes a housing unit and a coupling unit. The housing unit includes an outer shell. The coupling unit includes a hollow seat assembled to the outer shell, a coupling seat assembled to the hollow seat and disposed in the outer shell, a core tube having a front portion disposed in the hollow seat and a rear portion proximate to the coupling seat, and a biasing member for providing a biasing force to bias the core tube away from the coupling seat.

7 Claims, 6 Drawing Sheets

OPTICAL FIBER CONNECTOR

CROSS-REFERENCE TO RELATED APPLICATION

This application claims priority of Taiwanese application no. 100221450, filed on Nov. 14, 2011.

BACKGROUND OF THE INVENTION

1. Field of the Invention

The present invention relates to a connector, more particularly to an optical fiber connector.

2. Description of the Related Art

Optical fiber connectors may be classified as ferrule connectors (FC), standard connectors (SC), Lucent connectors (LC), straight tip connectors (ST), etc.

Each connector type has a distinct characteristic and structure. For example, FC connector provides good protection for an optical fiber core, but it utilizes a rotary connection method that easily causes scratches on the optical fiber core. SC connector has high strength, and its push-pull connection method can provide relatively more protection for the optical fiber core in the process of connecting therewith. LC connector has relatively smaller dimensions and is mostly utilized among enterprise networks. ST connector has a bayonet lock useful for preventing damage to the connector.

Due to differences in characteristics and structures among various types of connectors as mentioned above, manufacturing components, process and assembly procedure corresponding to each type of connector are different, thus resulting in higher overall manufacturing costs.

Therefore, the manufacturing issues of reducing components of different specifications to reduce raw material cost and reducing the number of different types of manufacturing and assembly procedures to reduce production cost become what the industry attempts on improving.

SUMMARY OF THE INVENTION

Therefore, an object of the present invention is to provide an optical fiber connector that can be easily modified to suit different connector types so as to result in lower manufacturing costs.

Accordingly, an optical fiber connector of the present invention comprises a housing unit and a coupling unit.

The housing unit includes an outer shell.

The coupling unit includes a hollow seat, a coupling seat, a core tube, and a biasing member. The hollow seat is assembled to the outer shell. The coupling seat is assembled to the hollow seat and is disposed in the outer shell. The core tube has a front portion disposed in the hollow seat and a rear portion proximate to the coupling seat. The core tube is adapted for positioning an optical fiber line. The biasing member is for providing a biasing force to bias the core tube away from the coupling seat.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
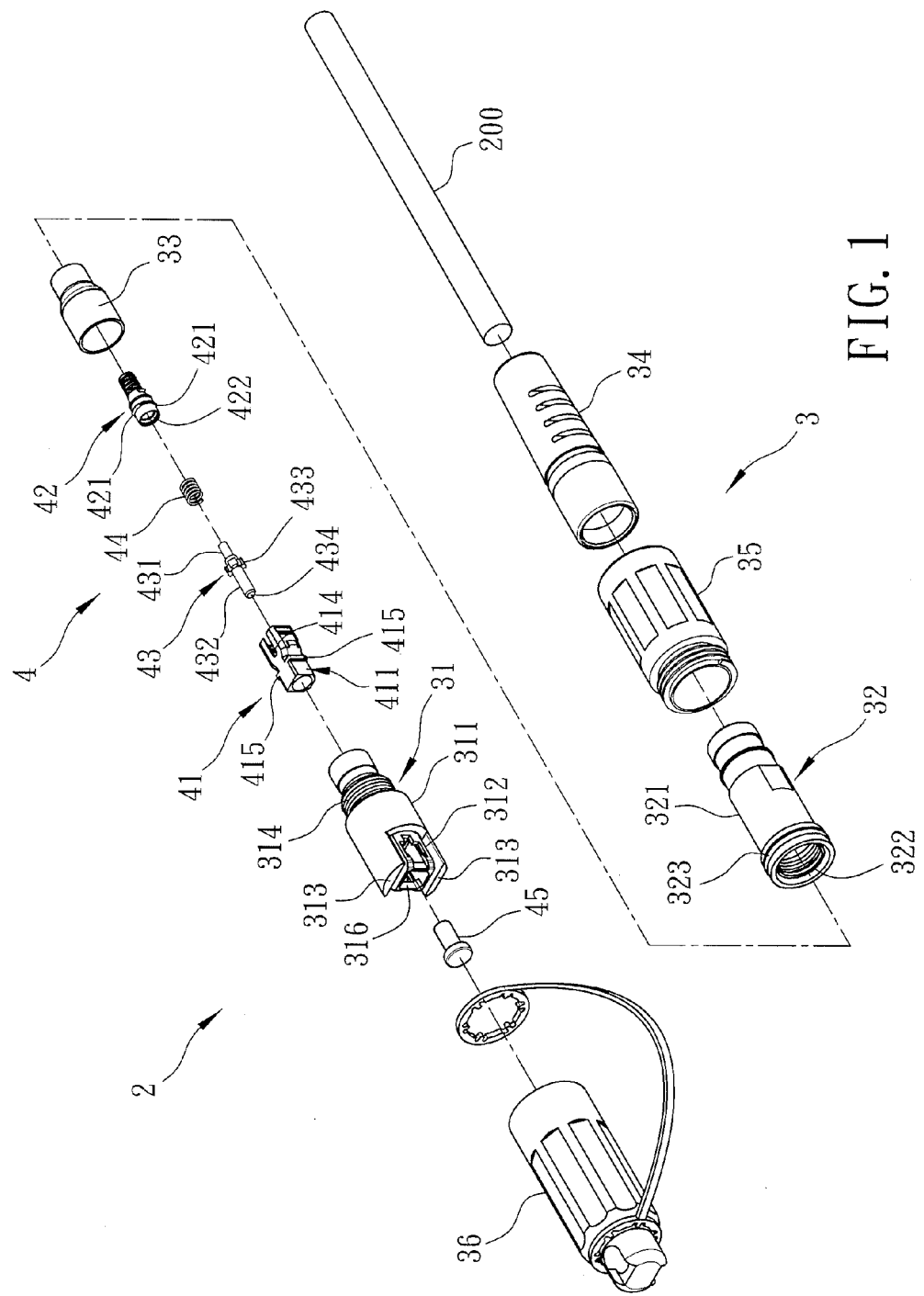
FIG. 1 is an exploded perspective view of the first preferred embodiment of an optical fiber connector according to the present invention.
Figure 2:
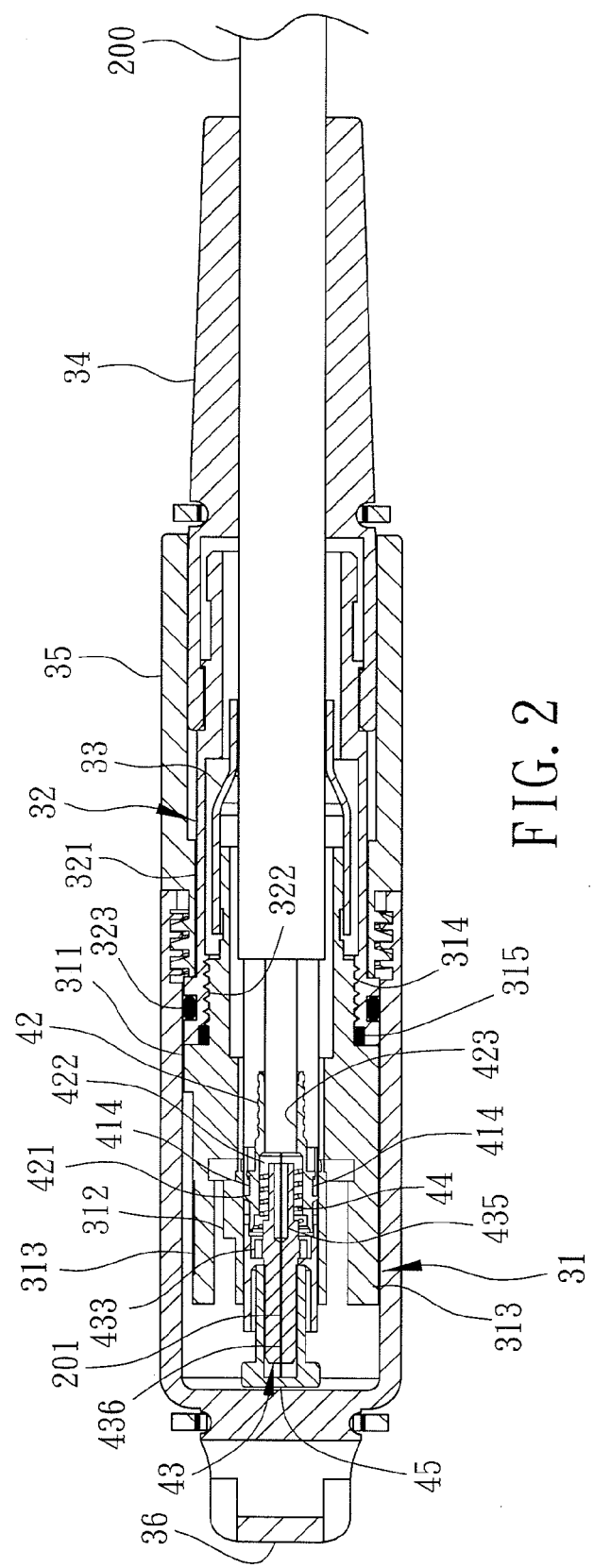
FIG. 2 is an assembled sectional view of the first preferred embodiment.
Figure 3:
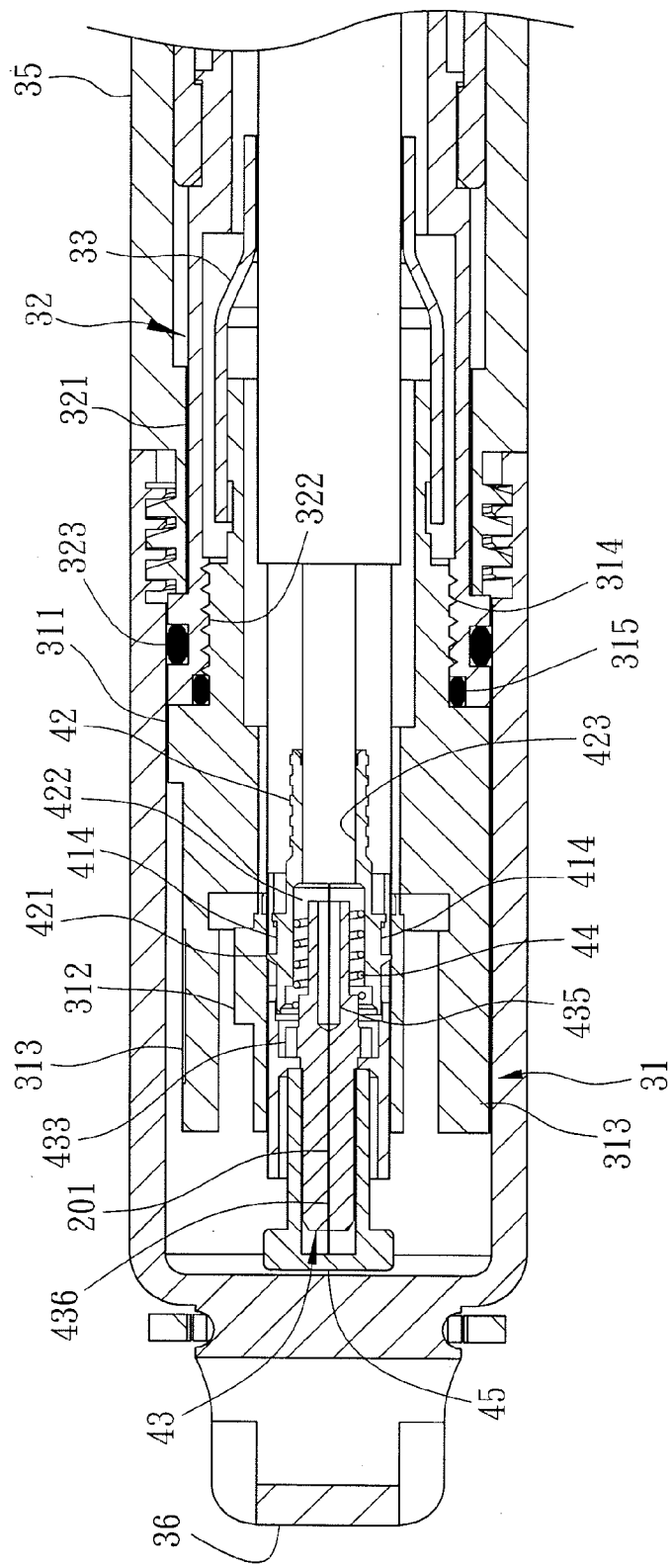
FIG. 3 is an enlarged fragmentary assembled sectional view of the first preferred embodiment.
Figure 4:
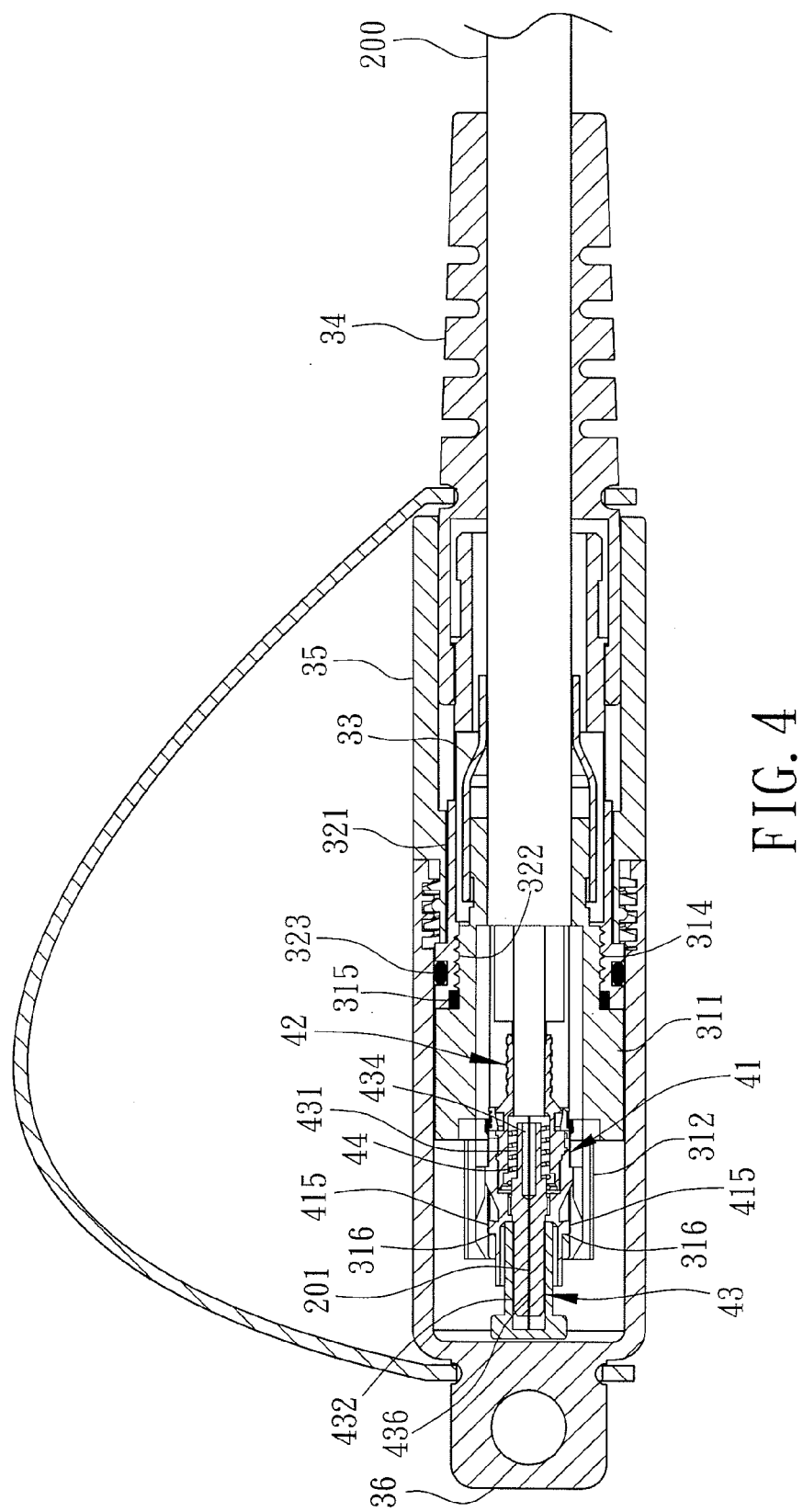
FIG. 4 is another assembled sectional view of the first preferred embodiment.
Figure 5:
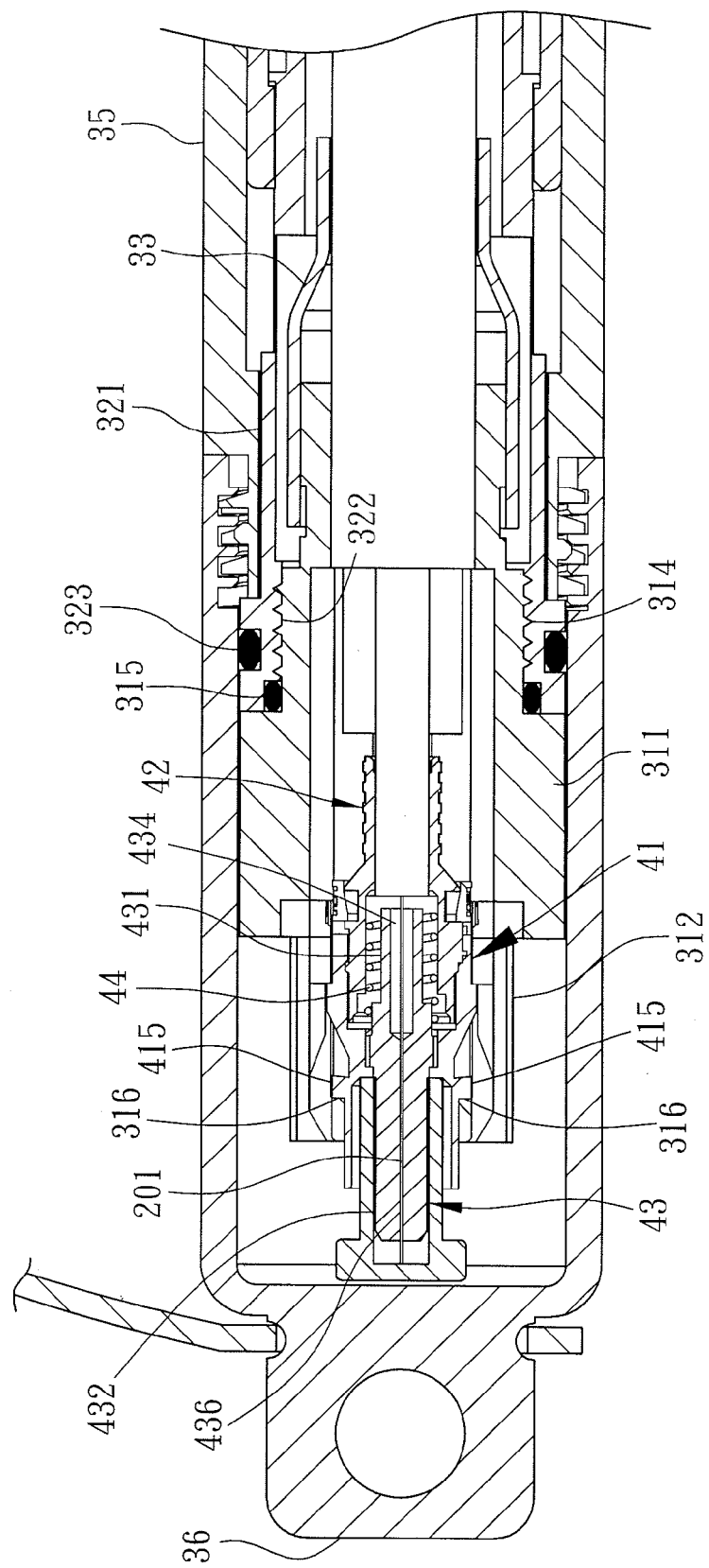
FIG. 5 is another enlarged fragmentary assembled sectional view of the first preferred embodiment.

Referring to FIG. 1, the first preferred embodiment of an optical fiber connector 2 according to the present invention is for use with an optical fiber cable 200. The optical fiber connector 2 includes a housing unit 3 and a coupling unit 4 connected to the housing unit 3.

Referring to FIGS. 1 to 5, the housing unit 3 includes an outer shell 31, and the coupling unit 4 includes a hollow seat 41 assembled to the outer shell 31, a coupling seat 42 assembled to the hollow seat 41 and disposed in the outer shell 31, a core tube 43 having a front portion disposed in the hollow seat 41 and a rear portion proximate to the coupling seat 42, a biasing member 44 for providing a biasing force to bias the core tube 43 away from the coupling seat 42, and a dustproof cover 45 for covering removably the core tube 43 to protect the core tube 43. The core tube 43 is for positioning an optical fiber line 201 of the optical fiber cable 200.

The hollow seat 41 includes a seat body 411 assembled to the outer shell 31 and formed with two spaced-apart first positioning components 414. In this embodiment, the first positioning components 414 are grooves. The coupling seat 42 is formed with two second positioning components 421 to engage the first positioning components 414, respectively. The second positioning components 421 extend into the first positioning components 414 in this embodiment. The coupling seat 42 has a first hole 422 that opens toward the seat body 411, and a second hole 423 that is opposite to the first hole 422. The core tube 43 has a first tube section 431 that extends into the first hole 422, a second tube section 432 that is connected integrally to the first tube section 431 and that extends through the seat body 411, a radial outward flange 433 that is disposed at a junction of the first and second tube sections 431, 432 and that is disposed to abut against the seat body 411, and a core hole 434 that extends through the first and second tube sections 431, 432 and that serves to position the optical fiber line 201. The core hole 434 includes a guiding section 435 formed in the first tube section 431 and a positioning section 436 extending from the guiding section 435 and being formed through the second tube section 432.

In this embodiment, the biasing member 44 is a compression spring that surrounds the first tube section 431 and that has opposite ends abutting against the coupling seat 42 and the core tube 43, respectively.

In this embodiment, when tension (pulling) or lateral forces are applied on the optical fiber cable 200, by virtue of a pressing ring 33 (to be described hereinbelow) that engages fittingly the optical fiber cable 200, a surrounding space defined between the outer shell 31 and the coupling seat 42, and the biasing member 44 between the core tube 43 and the coupling seat 42, the optical fiber line 201 may maintain a straight configuration and stretch within a certain amount relative to the optical fiber line 200, such that the characteristics of the optical fiber line 201 are not affected by the tension (pulling) or the lateral forces. Moreover, the guiding section 435 of the core hole 434 facilitates entry of the optical fiber line 201 of the optical fiber cable 200 into the positioning section 436 of the core hole 434.

In this embodiment, the outer shell 31 has a standard connector (SC) configuration, and has a rear shell body 311, and a front shell body 312 that is connected integrally to the rear shell body 311 and that is configured to receive the seat body 411 of the hollow seat 41. The front shell body 312 is formed with a pair of first stop portions 316, and the seat body 411 is formed with a pair of second stop portions 415 that cooperate with the first stop portions 316 to hinder removal of the seat body 411 from the front shell body 312. The outer shell 31 further has a pair of arm parts 313 that extend from the rear shell body 311 and that flank the front shell body 312.

In this embodiment, the housing unit 3 further includes a tubular sleeve 32 assembled to the rear shell body 311 of the outer shell 31, and a tail tube 34 sleeved on the tubular sleeve 32. Preferably, the rear shell body 311 is formed with an external screw thread 314, and the tubular sleeve 32 includes a tube body 321 coupled to the rear shell body 311 and formed with an internal screw thread 322 to engage threadedly the external screw thread 314.

In this embodiment, the housing unit 3 further includes a first waterproofing ring 315 provided on the rear shell body 311 for establishing a watertight seal between the rear shell body 311 and the tube body 321.

In this embodiment, the housing unit 3 further includes the pressing ring 33 disposed in the tubular sleeve 32 and sleeved fittingly on the outer shell 31 for engaging fittingly the optical fiber cable 200. The pressing ring 33 may provide protection when the optical fiber cable 200 is bent.

In this embodiment, the housing unit 3 further includes a coupling nut 35 sleeved on adjacent portions of the tubular sleeve 32 and the tail tube 34, an end cap 36 connected removably to the coupling nut 35 for covering the outer shell 31, and a second waterproofing ring 323 provided on the tubular sleeve 32 for establishing a watertight seal between the tubular sleeve 32 and the end cap 36. The coupling nut 35 facilitates handling and exertion of force upon the optical fiber connector 2. The second waterproofing ring 323 can prevent entry of liquid, dust and other contaminants.

Figure 6:
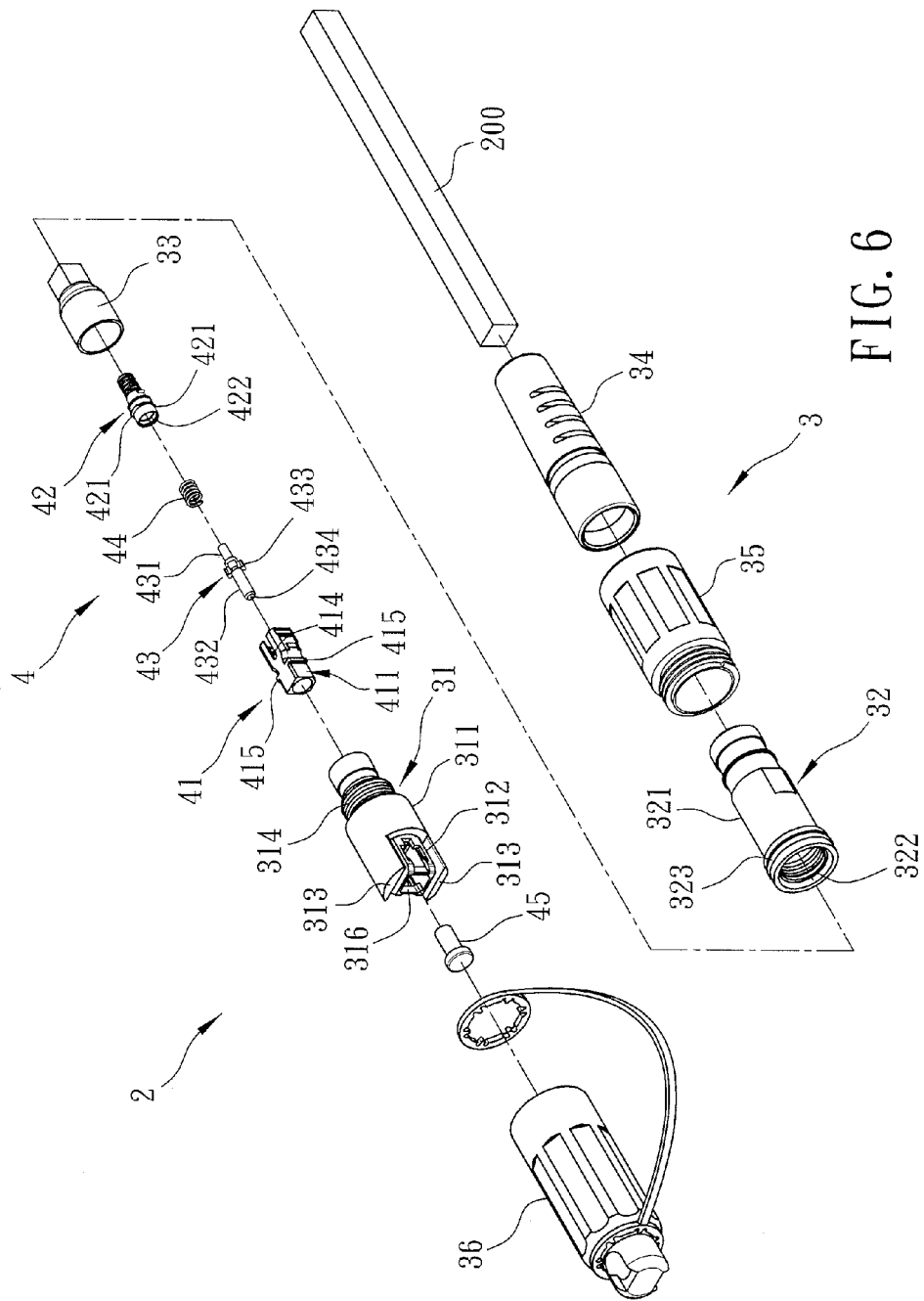
FIG. 6 is an exploded perspective view of the second preferred embodiment of an optical fiber connector according to the present invention.

Referring to FIG. 6, the second preferred embodiment of an optical fiber connector 2 according to the present invention is shown to be similar to the first preferred embodiment. Unlike the first preferred embodiment, the pressing ring 33 of this embodiment includes a connecting portion 331 facing the outer shell 31, and a positioning portion 332 opposite to the connecting portion 331 for positioning the optical fiber cable 200. The cross-section of the connection portion 331 is generally circular while the cross-section of the positioning portion 332 is generally rectangular. The positioning portion 332 of the pressing ring 33 having a different cross-section can the adapt optical fiber connector 2 to the optical fiber cables 200 of different cross-sections, thereby increasing adaptability.

During manufacture, it is only necessary to modify the hollow seat 41, the coupling seat 42, the core tube 43 and the biasing member 44 of the coupling unit 4 and the outer shell 31 to form optical fiber connectors 2 of different connector types, such as SC, LC, Miniature unit coupling (MU) and Multi-Fiber Push On connector (MPO). Accordingly, components for forming connectors conforming to different connector types may be reduced to thereby reduce material costs and minimize differences in manufacturing and assembly procedures.

In summary, the optical fiber connector 2 of the preferred embodiments of the present invention utilizes a coupling unit 4 coupling with a housing unit 3 to promote interchangeability. Moreover, by changing the hollow seat 41 of the coupling unit 4 and the outer shell 31 that matches with the hollow seat 41, various types of optical fiber connectors 2 can be formed.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An optical fiber connector comprising:
   a housing unit including
      an outer shell having a rear shell body, said rear shell body including an external screw thread,
      a tubular sleeve assembled to said rear shell body of said outer shell, said tubular sleeve including a tube body having a front part and a rear part, said front part of said tube body including an internal screw thread to threadedly engage said external screw thread of said rear shell body,
      a tail tube having a front tube part and a rear tube part, said front tube part being sleeved on said rear part of said tube body,
      a coupling nut sleeved on said front part of said tube body and said front tube part of said tube tail, said rear tube part of said tail tube extending outwardly of said coupling nut,
      an end cap connected removably to said coupling nut for covering said outer shell,
      a first waterproofing ring provided on said rear shell body for establishing a watertight seal between said rear shell body and said tube body, and
      a second waterproofing ring provided on said tubular sleeve for establishing a watertight seal between said tubular sleeve and said end cap; and
   a coupling unit including
      a hollow seat assembled to said outer shell,
      a coupling seat assembled to said hollow seat and disposed in said outer shell,
      a core tube having a front portion disposed in said hollow seat and a rear portion proximate to said coupling seat, said core tube being adapted for positioning an optical fiber line, and
      a biasing member for providing a biasing force to bias said core tube away from said coupling seat.

2. The optical fiber connector as claimed in claim 1, wherein said coupling unit further includes a dustproof cover for covering removably said core tube.

3. The optical fiber connector as claimed in claim 1, wherein:
   said hollow seat includes a seat body assembled to said outer shell and formed with a first positioning component,
   said coupling seat is formed with a second positioning component to engage said first positioning component, and
   one of said first and second positioning components is a groove, and the other one of said first and second positioning components extends into said groove.

4. The optical fiber connector as claimed in claim 3, wherein:
   said coupling seat has a first hole that opens toward said seat body, and a second hole that is opposite to said first hole, said core tube has a first tube section that extends into said first hole, a second tube section that is connected integrally to said first tube section and that extends through said seat body, a radial outward flange that is disposed at a junction of said first and second tube sections, and a core hole that extends through said first and second tube sections and that serves to position the optical fiber line, said core hole including a guiding section formed in said first tube section and a positioning section extending from said guiding section and being formed through said second tube section, and said biasing member is a compression spring that surrounds said first tube section and that has opposite ends abutting against said coupling seat and said core tube, respectively.

5. The optical fiber connector as claimed in claim 3, wherein said outer shell has a front shell body that is connected integrally to said rear shell body and that is configured to receive said seat body of said hollow seat, said front shell body being formed with a first stop portion, said seat body being formed with a second stop portion that cooperates with said first stop portion to hinder removal of said seat body from said front shell body.

6. The optical fiber connector as claimed in claim 1, wherein said housing unit further includes a pressing ring disposed in said tubular sleeve and sleeved fittingly on said outer shell for engaging an optical fiber cable.

7. The optical fiber connector as claimed in claim 6, wherein said pressing ring further includes a connecting portion facing the outer shell and a positioning portion opposite to the connecting portion for positioning the optical cable, a cross-section of said connection portion being generally circular, a cross-section of said positioning portion being generally rectangular.

* * * * *